United States Patent [19]

Booth, Jr. et al.

[11] Patent Number: 4,620,874

[45] Date of Patent: Nov. 4, 1986

[54] METAL MODIFIED PHENOLIC RESIN COLOR DEVELOPERS

[75] Inventors: William O. Booth, Jr., Tuscaloosa, Ala.; Thomas M. Galkiewicz, South Plainfield, N.J.; Stanley L. Forehand, Tuscaloosa, Ala.

[73] Assignee: BTL Specialty Resins Corporation, Warren, N.J.

[21] Appl. No.: 625,508

[22] Filed: Jun. 28, 1984

[51] Int. Cl.$^4$ .............................................. C09D 11/00

[52] U.S. Cl. ...................................... 106/21; 346/211; 346/212; 346/225; 427/145; 427/150; 428/913; 525/506

[58] Field of Search .................. 106/21; 346/211, 212, 346/225; 427/144, 145, 150; 428/913; 525/506

[56] References Cited

U.S. PATENT DOCUMENTS 3,624,038 11/1971 Weidner ............................. 528/140
4,226,962 10/1980 Stolfo ................................. 346/210

OTHER PUBLICATIONS

Martin, R. W., "The Chemistry of Phenolic Resins", John Wiley & Sons, (1956), p. 109.

R. M. Associates Management Consultants, *Review of the Markets and Technology of Thermal Paper.*

R. M. Associates, *A Review and Assessment of Worldwide Chemical Carbonless Paper Markets and Technology,* 1983.

*Primary Examiner*—Amelia B. Yarbrough
*Attorney, Agent, or Firm*—Rodman & Rodman

[57] ABSTRACT

A carbonless copying color developer comprising a thermoplastic chelated metal modified phenolic resin formed from the in situ reaction of formaldehyde with a mixture of a para-substituted phenol, salicyclic acid, and a metal oxide. The reaction is conducted under hydrous conditions and at atmospheric pressure, with substantially no unreacted metal oxide residue.

20 Claims, No Drawings

METAL MODIFIED PHENOLIC RESIN COLOR DEVELOPERS

BACKGROUND OF THE INVENTION

This invention relates to metal modified phenolic resins for use in carbonless copying and record systems.

Carbonless copying and record systems include thermal paper and pressure sensitive paper. Thermal paper and pressure sensitive paper copying systems each utilize a color developer and a color precursor as components which are coated onto the paper.

In the thermal paper system, legible colored images are developed through a chemical reaction between the color developer and the color precursor. This reaction is initiated by the localized application of heat from the printing head of a thermal printer, which causes the components to fuse and form the print.

Thermal papers are used in data processing terminals, calculators, chart and facsimile recording devices, electrocardiographs, and various non-impact printing units.

In pressure sensitive paper systems, the color precursor, also referred to as chromogenic material, is generally in the form of microscopic capsules, which are coated onto the paper.

This coating is referred to as the "CB coating." The paper with the CB coating is then placed in contact with a supporting sheet of paper whose surface is coated with one or more color developers. The color developer coating is referred to as the "CF coating."

The CB and CF coatings are generally colorless and remain so until sufficient pressure is brought upon the superimposed CB and CF coatings as with a typewriter. This causes the encapsulated color precursors to rupture from the CB coating and transfer to the CF coating whereupon reaction occurs with the color developer to form an image restricted along the lines wherein the pressure was applied.

Another type of pressure sensitive paper, referred to as "self-contained paper" contains an imaging system in a single coating that is applied to only one side of the paper. The single coating contains both the color precursor, again generally in encapsulated form, and the color developer. The application of pressure to the surface of the paper, as with a typewriter or other writing instrument, causes the rupture of the color precursor capsule and its reaction with the surrounding color developer to form an image.

U.S. Pat. Nos. 3,539,375 and 3,293,055 both to Baum, and U.S. Pat. Nos. 3,895,173 and 3,843,384 both to Adachi et al are related to thermal paper systems.

U.S. Pat. No. 2,712,507 to Green and U.S. Pat. No. 3,672,935 to Miller et al relate to pressure sensitive copying systems. U.S. Pat. No. 2,730,457 to Green and U.S. Pat. No. 4,197,346 to Stevens et al relate to self-contained pressure sensitive systems.

Phenol-aldehyde (novolak) resins are widely used as color developers in carbonless paper copying systems. See U.S. Pat. No. 3,455,721 to Phillips et al; U.S. Pat. No. 3,466,184 to Bowler et al; U.S. Pat. No. 3,672,935 to Miller et al and U.S. Pat. No. 4,166,664 to Kay et al.

It is also known to use metal compounds to enhance the color forming reaction of phenolic resins with chromogens. U.S. Pat. No. 3,516,845 to Brockett discloses acidic water soluble metal salts incorporated in aqueous coatings of ground novolak resins. U.S. Pat. No. 3,723,156 to Brockett et al discloses a similar use of oil soluble metal salts. U.S. Pat. No. 3,732,120 to Brockett et al and U.S. Pat. No. 3,737,410 to Mueller disclose the interaction of a metal compound such as zinc hydroxybenzoate, zinc acetylacetonate and zinc dibenzoate with a para-substituted novolak resin by melting the resin and metal compound together to give a color developer which shows increased color intensity and resistance to fading.

U.S. Pat. No. 4,173,684 to Stolfo discloses metal modified novolak resins containing salicylic acid formed by combining one or more para-substituted phenols and salicylic acid by condensation in the presence of an acid catalyst with formaldehyde. The novolak resins are then metal modified by melting with a metal salt.

U.S. Pat. No. 3,732,120 to Brockett et al discloses that the effectiveness of metal-modified resins in enhancing color production in chromogenic dye precursors such as crystal violet lactone (CVL), is inversely related to the chelating-ability of the metal ion used to make the metal modified resin.

U.S. Pat. No. 4,173,684 to Stolfo and U.S. Pat. No. 3,732,120 to Brockett et al disclose the formation of metal modified novolak resins in a two-stage process. The first stage involves the formation of the resin, followed by the metal modification of the resin, or chelation step.

SUMMARY OF THE INVENTION

The present invention comprises a unique preparation of a metal modified phenolic resin wherein the resin is simultaneously formed and undergoes metal modification in an in situ reaction. In this manner, the inventive process avoids the more costly, complicated, and time consuming two-step reaction of the prior art.

DESCRIPTION OF THE PREFERRED EMBODIMENTS

In accordance with the present invention, a metal modified phenolic resin suitable for use in carbonless copying systems as a color developer, is formed from the in situ reaction of a para-substituted phenol, salicylic acid, and formaldehyde in the presence of a metal oxide.

Thus, the para-substituted phenol along with the salicylic acid and metal oxide are mixed together and heated to a temperature sufficient to form the metal modified resin. Formaldehyde is then charged to the reaction mixture in amounts sufficient for the reaction mixture to undergo simultaneous in situ conversion to a metal modified resin product.

This is in contrast to the prior art as exemplified by U.S. Pat. No. 4,173,684 to Stolfo wherein para-substituted alkyl phenol and salicylic acid is charged with an acidic catalyst and reacted with formaldehyde proceeding through partial dehydration followed by a separate metal chelation step. In essence, the novolac is preformed and a separate reaction is necessary for the metal chelation step.

Carbonless copying systems using the metal modified phenolic resins prepared in accordance with the present invention have demonstrated intensity and rate of color image development, fade resistance and storage stability at least as good as those of prior art metal modified novolak resins which have been prepared in two-step reactions involving initial formation of the phenol formaldehyde resin followed by the metal modification or chelation step.

In the present invention, the chelation or metal modification of the resin occurs essentially in situ simultaneously along with the formation of the resin. It has been theorized that the metal oxide serves a dual function in this reaction. Thus, it is believed the metal oxide acts as a catalyst in the reaction of the phenol, salicylic acid and formaldehyde, thereby replacing the conventional acid catalysts of the prior art, such as sulfuric, hydrochloric, phosphoric, oxalic and toluene sulfonic acid. Secondly, the metal oxide is also believed to react simultaneously with the salicylic acid to form a chelated resin, thereby eliminating the conventional subsequent step of chelating a previously formed phenol-formaldehyde resin, as disclosed, for example, in U.S. Pat. No. 4,025,490 to Weaver.

Suitable metal oxides in the present invention include magnesium, copper, zinc, cadmium and aluminum, with zinc oxide being preferred.

In the conventional two-step reaction of the prior art wherein chelation of the resin is performed subsequent to the formation of the resin, the zinc oxide would ordinarily be insoluble in the resin. However, in the present invention, wherein zinc oxide is initially present in the resin forming reaction mixture, toluene insolubles analysis of the inventive product shows less than 1% unreacted zinc oxide residue. Due to the fact that zinc oxide does not react with phenol or formaldehyde, it is believed that the zinc oxide participates in the reaction by reacting with the salicylic acid, or an intermediate reaction product of the process.

The salicylic acid, also known as 2-hydroxybenzoic acid is substituted for a portion of the phenol reactant to modify the resin and increase its reactivity. The salicylic acid also reacts with the formaldehyde, as a phenol, to form part of the resin. As has already been noted, the salicylic acid, rather than being post-charged to the already formed resin, or used only in a subsequent chelation step, partakes in the reaction from the inception as an integral part of the resin formation.

The phenols useful as reactants in the present invention include the para-substituted phenols, such as alkyl phenols, aryl phenols, arylalkyl phenols, and mixtures thereof. More specifically, these para-substituted phenols include para-phenyl phenol, para-ethyl phenol, para-propyl phenol, para-butyl phenol, para-amyl phenol, para-hexyl phenol, para-heptyl phenol, para-octyl phenol, para-nonyl phenol, para-decyl phenol and para-dodecyl phenol. Preferred phenols are the para-octyl phenol and para-tert butyl phenol.

The formaldehyde used in the present invention is generally in aqueous solution, preferably of 50 weight % formaldehyde gas in water. However, other aqueous concentrations of formaldehyde can also be used, such as the 37 weight % formaldehyde solution, commonly known as Formalin.

In conducting the inventive reaction for the formation of the metal modified phenolic resin, it has been found that the mole ratio of salicylic acid to the para-substituted phenol can vary from about 0.05–1 to about 1.5–1, and preferably 0.2–0.4:1, respectively.

The mole ratio of formaldehyde to the combined salicylic acid and para-substituted phenol can vary from about 0.1–1:1, most preferably about 0.3–0.8:1 respectively.

The metal oxide can vary from about 1 to 10 percent by weight of the combined salicylic acid and para-substituted phenol, most preferably 3 to 5 percent by weight.

In conducting the process, an inert gas blanket of helium, nitrogen, or other like gas is maintained over the reaction mixture to avoid discoloration which can result from contact with the oxygen in the ambient air.

The metal modified phenolic resin product of the present invention can be in the form of a lump, flake, or finely divided particle. The resin will generally have a softening point temperature which varies from about 85° to 120° C., and preferably 92° to 96° C., in accordance with ASTM Designation E 28-67 (1972).

The metal modified resin product of the present invention can have an ash content of about 2 to 6%, with about 3 to 4% being preferred. The ash content is determined by placing a specific amount of the resin, such as 5 grams, into a clean, dry porcelain crucible and then igniting the contents in a furnace at a temperature of about 700° to 800° C. for about four hours. The crucible is cooled and the contents reweighed. Ash content is then calculated in accordance with the following formula:

$$\% \text{ Ash} = \frac{(A)\ (\text{hundred})}{B}$$

where A=net weight of residue, and B=sample weight.

The metal modified phenolic resins of the present invention are also evaluated for color by measuring the percent transmission of a solution of the resin. The percent transmission of the metal modified phenolic resins can vary from about 70 to 100%, most often 75 to 85%. In determining the percent transmission, the resin is dissolved in toluene, and a Spectronic 20 electrophotometer or equivalent, equipped with a one-half inch cell attachment is used to measure the percent transmission of the resin solution at 425 wavelength.

Another means for measuring the efficacy of the inventive process and the resin product is by means of determining the percent insolubles in toluene. This amount will preferably be less than about 1%, and is a measure of the zinc oxide solubility in the toluene. This test also shows the extent of chelation. In the procedure for determining % insolubles, approximately 5 grams of a resin sample are dissolved in about 45 grams of toluene. The solution is then filtered. The filtered solution is then placed in an oven at 105° C. and dried for about 30 minutes. The amount of toluene insolubles is determined in accordance with the following equation:

$$\text{toluene insolubles} = \frac{\begin{pmatrix}\text{wt. of crucible} \\ \text{plus filtrate}\end{pmatrix} - (\text{wt. of crucible}) \times 100}{\text{sample weight}}$$

The metal modified phenolic resin product can be conveniently stored or shipped as the case may be, or easily converted into a dispersion for use as a color developer in a carbonless copying system.

In converting the metal modified phenolic resin to a dispersion, polyvinyl alcohol is used to emulsify the resin. In preparing the dispersion, a mixture of water, resin, polyvinyl alcohol and a dispersing agent are combined. The concentration of the polyvinyl alcohol can vary from about 2 to 10%, and preferably about 8% by weight of the resin to be dispersed, as shown for example in U.S. Pat. No. 4,025,490 to Weaver. Conventional mixing equipment such as a Kadymill, Waring blender, Cowles mixer, and the like, can be used to form the dispersion.

In the examples which follow, all parts and percentages are by weight, unless otherwise noted.

EXAMPLE 1

A reaction kettle was charged with 200 parts (0.905 moles) of nonyl phenol, 40 parts (0.29 moles) of salicylic acid, 9 parts (0.11 moles) of zinc oxide and 0.26 parts sodium dioctyl sulfosuccinate. After heating the above mix to 90°-100° C., 49.7 parts of commercially available 50% formaldehyde containing 0.83 moles of formaldehyde were added to the heated mixture. The mixture was refluxed for three hours. Water was stripped from the reaction mixture under vacuum to obtain the desired resin softening point. Maintaining an inert gas blanket to prevent darkening caused by oxygen, the resinous material was discharged, cooled until hardened, then ground to a 12 mesh particle size.

EXAMPLE 2

The procedure of Example 1 was repeated using 200 parts (0.97 moles) of para-tert-octylphenol instead of nonyl phenol, 40 parts (0.29 moles) salicylic acid, 9 parts (0.11 moles) zinc oxide, 0.26 parts sodium dioctyl sulfosuccinate and 43.6 parts of 50% aqueous formaldehyde (0.73 moles of formaldehyde). A suitable resinous material was produced.

EXAMPLE 3

The procedure of Example 2 was repeated using 200 parts (0.97 moles) of para-tert-octylphenol, 40 parts (0.29 moles) salicylic acid, 7.8 parts (0.095 moles) zinc oxide, 0.26 parts of sodium dioctyl sulfosuccinate and 41.4 parts of 50% aqueous formaldehyde (0.69 moles of formaldehyde). A suitable resinous material was produced.

EXAMPLE 4

The procedure of Example 2 was repeated using 200 parts (0.97 moles) of para-tert-octylphenol, 40 parts (0.29 moles) salicylic acid, 9 parts (0.11 moles) zinc oxide, 0.26 parts sodium dioctyl sulfosuccinate and 45.6 parts of 50% aqueous formaldehyde (0.76 moles of formaldehyde). A suitable resinous material was produced.

EXAMPLE 5

The procedure of Example 2 was repeated using 200 parts (0.97 moles) of para-tert-octylphenol, 44 parts (0.32 moles) salicylic acid, 9.8 parts (0.12 moles) zinc oxide, 0.28 parts sodium dioctyl sulfosuccinate and 50.7 parts of 50% aqueous formaldehyde (0.845 moles of formaldehyde). A suitable resinous material was produced.

EXAMPLE 6

The procedure of Example 2 was repeated using 200 parts (0.97 moles) of para-tert-octylphenol, 40 parts (0.29 moles) salicylic acid, 9 parts (0.11 moles) zinc oxide, 0.26 parts sodium dioctyl sulfosuccinate and 41.5 parts of 50% aqueous formaldehyde (0.69 moles of formaldehyde). A suitable resinous material was produced.

What is claimed is:

1. A method for producing a carbonless copying color developer consisting essentially of a theremoplastic chelated metal modified phenolic resin, said method consisting essentially of:

(a) forming a mixture of a para-substituted phenol, salicylic acid and metal oxide, wherein the mole ratio of salicylic acid to para-substituted phenol varies from about 0.05-1.5:1, respectively, and wherein the amount of metal oxide varies from about 1 to 10%, by weight of the combined salicylic acid and para-substituted phenol;

(b) heating said mixture at atmospheric pressure to its refluxing temperature;

(c) reacting said heated mixture with formaldehyde, in an inert atmosphere, and under hydrous conditions, to thereby form said thermoplastic chelated metal modified resin in an insitu, one-step reaction, wherein the mole ratio of formaldehyde to the combination of salicylic acid and para-substituted phenol varies from about 0.1-1.0:1, respectively, and wherein there is substantially no unreacted metal oxide residue.

2. The method of claim 1, wherein the para-substituted phenols are selected from the group consisting of alkyl phenols, aryl phenols, arylalkyl phenols, and mixtures thereof.

3. The method of claim 2, wherein the para-substituted phenols are selected from the group consisting of para-phenyl phenol, para-ethyl phenol, para-propyl phenol, para-butyl phenol, para-amyl phenol, para-hexyl phenol, para-heptyl phenol, para-octyl phenol, para-nonyl phenol, para-decyl phenol and para-dodecyl phenol.

4. The method of claim 3, wherein said para-substituted phenols are selected from the group consisting of para-octyl phenol and para-tert-butyl phenol.

5. The method of claim 1, wherein said para-substituted phenol is para-octyl phenol.

6. The method of claim 5, wherein said para-substituted phenol is para-tert-butyl phenol.

7. The method of claim 1, wherein the mole ratio of salicylic acid to para-substituted phenol varies from about 0.2-0.4:1.

8. The method of claim 1, wherein the mole ratio of formaldehyde to the combined salicylic acid and para-substituted phenol varies from about 0.3-0.8:1, respectively.

9. The method of claim 1, wherein the metal oxide is selected from the group consisting of magnesium, copper, zinc, cadmium, and aluminum.

10. The method of claim 9, wherein said metal oxide is zinc oxide.

11. The method of claim 10, wherein the amount of zinc oxide varies from about 3 to 5% by weight of the combined salicylic acid and para-substituted phenol.

12. A product formed by the method of claim 1.

13. The method of claim 1, wherein the temperature of step (b) varies from about 90° to 100° C.

14. The method of claim 1, wherein water is removed from the reaction mixture of step (c) until said chelated metal modified resin has a softening point temperature of about 85° to 120° C.

15. The method of claim 14, wherein the softening point temperature is about 92° to 96° C.

16. The method of claim 1, wherein an aqueous solution of formaldehyde is used in step (c).

17. A carbonless copying color developing composition consisting essentially of a thermoplastic chelated metal modified phenolic resin, wherein said resin is the in situ reaction product of formaldehyde with a mixture of a para-substituted phenol, salicylic acid, and a metal oxide, wherein said reaction is conducted under hydrous conditions and wherein the mole ratio of salicylic acid to para-substituted phenol varies from about 0.05-1.5:1, respectively, and the mole ratio of formaldehyde to the combination of salicylic acid and para-substituted phenol varies from about 0.1–1.0:1, and the amount of metal oxide varies from about 1 to 10%, by weight, of the combined salicylic acid and para-substituted phenol, and wherein there is substantially no unreacted metal oxide residue.

18. The resin of claim 17, having an ash content of about 2 to 6%.

19. The resin of claim 18, having a percent transmission of about 70 to 100%, as measured with an electrophotometer.

20. The resin of claim 17, wherein the percent insolubles in toluene is less than about 1%.

* * * * *